(12) United States Patent
Hsieh et al.

(10) Patent No.: US 8,087,320 B2
(45) Date of Patent: Jan. 3, 2012

(54) SPECIAL PATH GENERATING DEVICE

(75) Inventors: Long-Chang Hsieh, Huwei Township, Yunlin County (TW); Yao-Lin Peng, Huwei Township, Yunlin County (TW)

(73) Assignee: National Formosa University, Yunlin County (TW)

( * ) Notice: Subject to any disclaimer, the term of this patent is extended or adjusted under 35 U.S.C. 154(b) by 765 days.

(21) Appl. No.: 12/222,685

(22) Filed: Aug. 14, 2008

(65) Prior Publication Data
US 2009/0044644 A1 Feb. 19, 2009

(30) Foreign Application Priority Data
Aug. 17, 2007 (TW) .............................. 96130417 A

(51) Int. Cl.
*G05G 11/00* (2006.01)
(52) U.S. Cl. ............... 74/490.09; 74/490.07; 74/490.13; 74/55
(58) Field of Classification Search ............... 74/490.07, 74/490.09, 490.13, 567, 569, 25, 53, 55; 451/11, 259
See application file for complete search history.

(56) References Cited

U.S. PATENT DOCUMENTS

| 3,703,834 A * | 11/1972 | Beezer ............... 74/57 |
| 3,751,996 A * | 8/1973 | Beezer ............... 74/53 |
| 3,881,362 A * | 5/1975 | Beezer ............... 74/53 |
| 5,477,743 A * | 12/1995 | Yanagisawa ........... 74/490.09 |
| 6,098,478 A * | 8/2000 | Sandrock ............ 74/53 |
| 7,581,459 B2 * | 9/2009 | Gourjon ............. 74/55 |
| 2008/0308982 A1 * | 12/2008 | Weston ............. 269/58 |
| 2011/0070812 A1 * | 3/2011 | Hsieh et al. ............ 451/259 |

FOREIGN PATENT DOCUMENTS
JP 2003092337 A * 3/2003
TW 431258 U * 4/2001
WO WO 9500776 A1 * 1/1995

* cited by examiner

*Primary Examiner* — Alicia Torres
(74) *Attorney, Agent, or Firm* — Rosenberg, Klein & Lee

(57) ABSTRACT

A special path generating device includes a base, a first axis slide assembly, a second axis slide assembly, a working portion, a driving portion, a first cam and a second cam. This first axis slide assembly includes a first bar and a first slide. The second axis slide assembly includes a second bar and a second slide. This working portion is mounted on the second slide that has two contacting portions. The driving portion is mounted on the base. When the driving portion drives the driving shaft rotating, the first cam and the second cam rotate accordingly and makes the working portion generating a special path. It can generate a constant-speed circular movement. It is easy to control. In addition, its volume is small.

4 Claims, 6 Drawing Sheets

SPECIAL PATH GENERATING DEVICE

BACKGROUND OF THE INVENTION

1. Field of the Invention

The present invention relates to a special path generating device. Particularly, this invention is a device that can produce double circular path. In addition, it generates a constant-speed circular movement. It is easy to control. Plus, its volume is small.

2. Description of the Prior Art

There are many traditional path generating devices. Referring to FIG. 1, it is the typical X-Y plotter. It has a working surface 71, working slide 72, a Y-axis sliding assembly 73 and an X-axis sliding assembly 74. The working slide 72 can slide on the Y bar 731 of the Y-axis sliding assembly 73. Furthermore, this Y-axis sliding assembly 73 can slide on the X bar 741 of the X-axis sliding assembly 74. Therefore, by utilizing a controller (not shown), the moving path of the working point 721 of the working slide 72 can be controlled. For example, it can generate a circular path or other specific path.

The disadvantages of the above-mentioned conventional device are described as follows. This device needs two driving sources. The degree of freedom is 2. Besides, it is required to input precise X-Y coordinates information. If the user wants to obtain a smooth curve, this curve must be generated by several straight lines (connected together to obtain a proximal one). In fact, it is hard to control it very precisely. In addition, the controller needs complicated computation and conversion (into many X and Y axis moving commands). So, the operation of the entire system is quite complicated.

Another traditional special path generating device, as shown in FIG. 2, is a polishing machine for optical fibers. It includes a polishing (or grinding) table 81, a X-axis sliding set 82, a the Y-axis sliding set 83, a X-axis moving generator 84, a Y-axis moving generator 85, and a driving assembly 86. This polishing table 81 can slide on two X rods 821 of the X-axis sliding set 82. This X-axis sliding set 82 can slide on two Y rods 831 of the Y-axis sliding set 83. Also, the X-axis moving generator 84 has an X-axis moving link 841 and a first circular disk 842. One end of X-axis moving link 841 is pivoted with the polishing table 81. The other end of the X-axis moving link 841 is pivoted with a first eccentric point 843 of the first circular disk 842. The Y-axis moving generator 85 has a Y-axis moving link 851 and a second circular disk 852. One end of the Y-axis moving link 851 is pivoted with the polishing table 81. The other end of the Y-axis moving link 851 is pivoted with a second eccentric point 853 of the second circular disk 852. Moreover, the driving assembly 86 contains a rotational driving portion 861 (such as a motor), an auxiliary roller 862 and a belt 863 (such as a timing belt). This rotational driving portion 861 drives the belt 863 moving. Accordingly, the first circular disk 842 and the second circular disk 852 are rotated simultaneously. By means of the X-axis moving link 841 and Y-axis moving link 851, a special path 87 is generated on the polishing table 81 (as shown in FIG. 3, similar to a 8-shape, but not an exact double circular path). Therefore, when a user wants to polish (or grind) the end surface of an optical fiber (that has a circular cross-sectional area), one polishing work moves from the lower-right to the upper-left direction (generating many lower-right to upper-left grinding cracks or lines) and the next polishing work should move from the lower-left to the upper-right (generating many lower-left to upper-right grinding cracks or lines). After which, it just repeats again and again. Thus, there will not be any grinding cracks or lines left on this polishing surface. That is, the polished surface is extremely flat. It is suitable to connect with other flat surface without any contacting gap. So, it can meet the high-standard requirement of the optical fiber related products.

However, although the above-mentioned device only needs one driving source, if this belt 863 is too long, it still might be extended a little. Please note that the belt 863 propels the first circular disk 842 and the second circular disk 852. Further, it propels the X-axis moving link 841 and Y-axis moving link 851 as well. If this belt is too loose, it will cause some discrepancies or errors during operation. It cannot be precisely controlled. Besides, the entire system and controlling method become more complicated. So, it cannot produce the exact double circular path nor generate a constant-speed circular movement.

SUMMARY OF THE INVENTION

The primary object of the present invention is to provide a special path generating device. In which, it can produce double circular path.

The second object of the present invention is to provide a special path generating device. It can generate a constant-speed circular movement.

The next object of the present invention is to provide a special path generating device. It is easy to control.

Another object of the present invention is to provide a special path generating device. Its volume is small.

DETAILED DESCRIPTION OF THE PREFERRED EMBODIMENT

Figure 1:
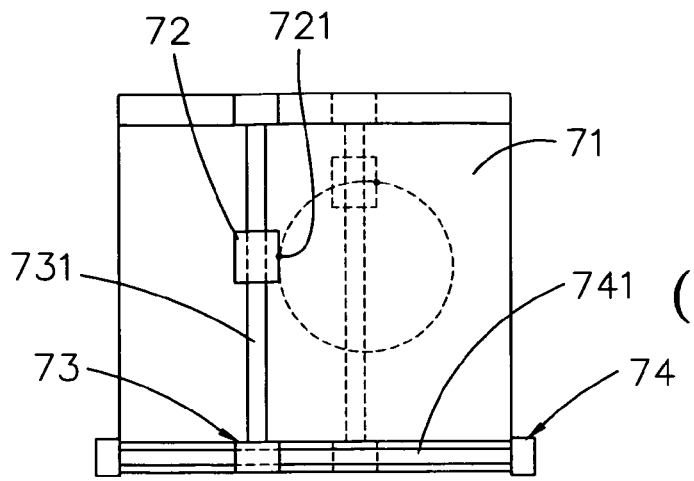
FIG. 1 is a view showing the first traditional special path generating device.
Figure 2:
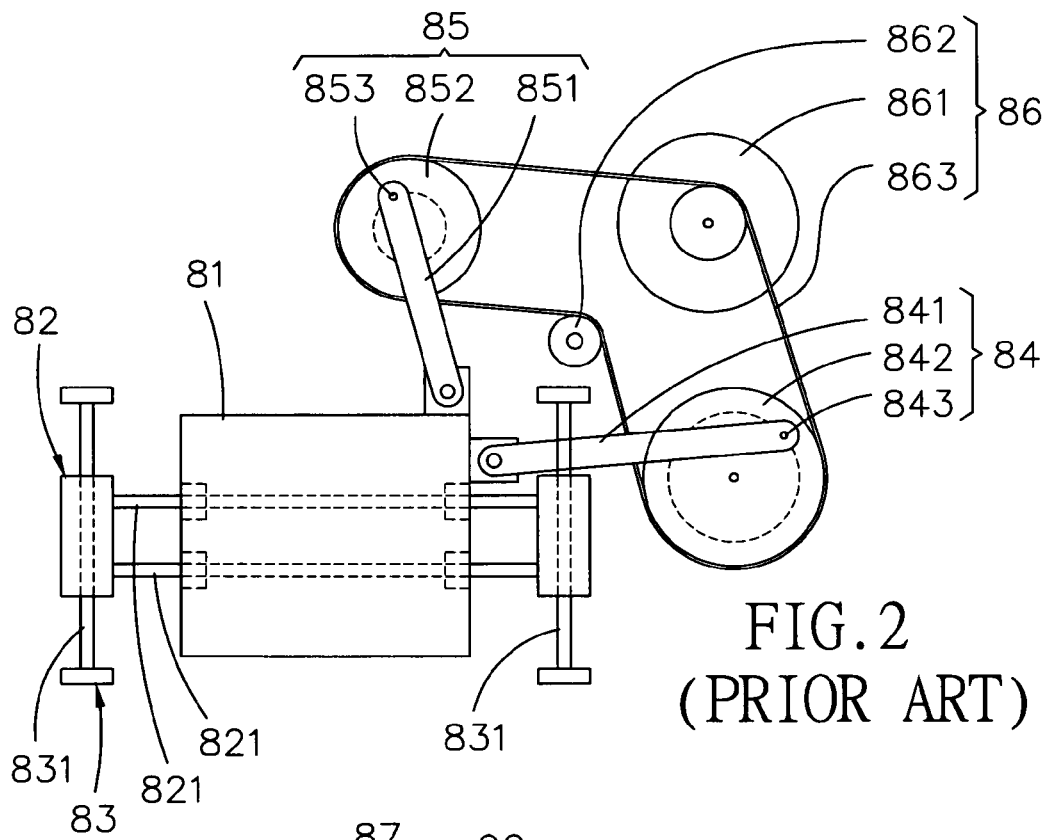
FIG. 2 is a view illustrating the second traditional special path generating device.
Figure 3:
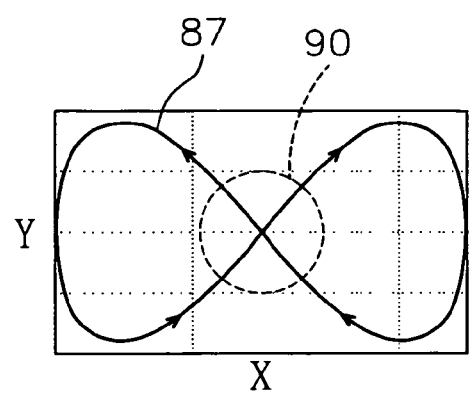
FIG. 3 is a view showing the path generated by the second traditional special path generating device.
Figure 4:
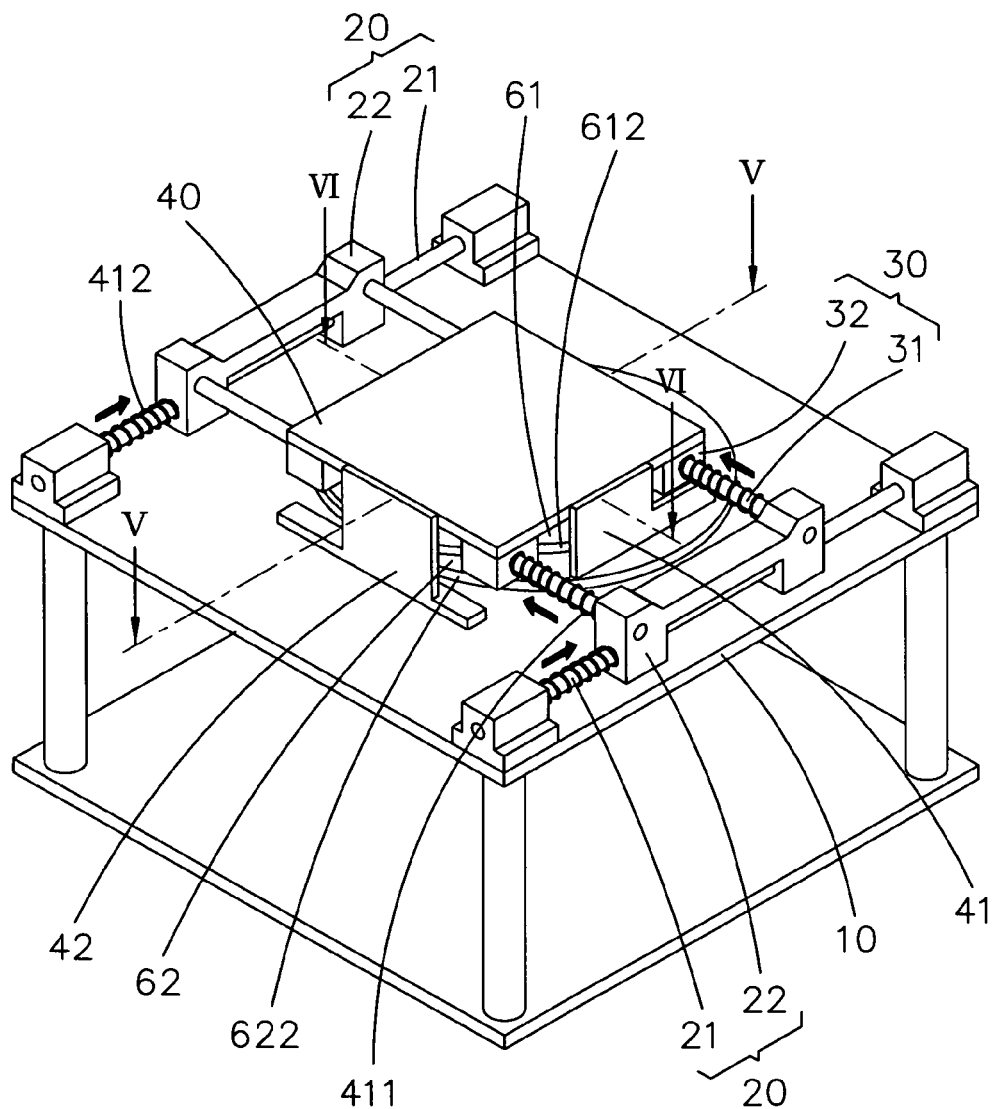
FIG. 4 is a perspective view of the first preferred embodiment of the present invention.
Figure 5:
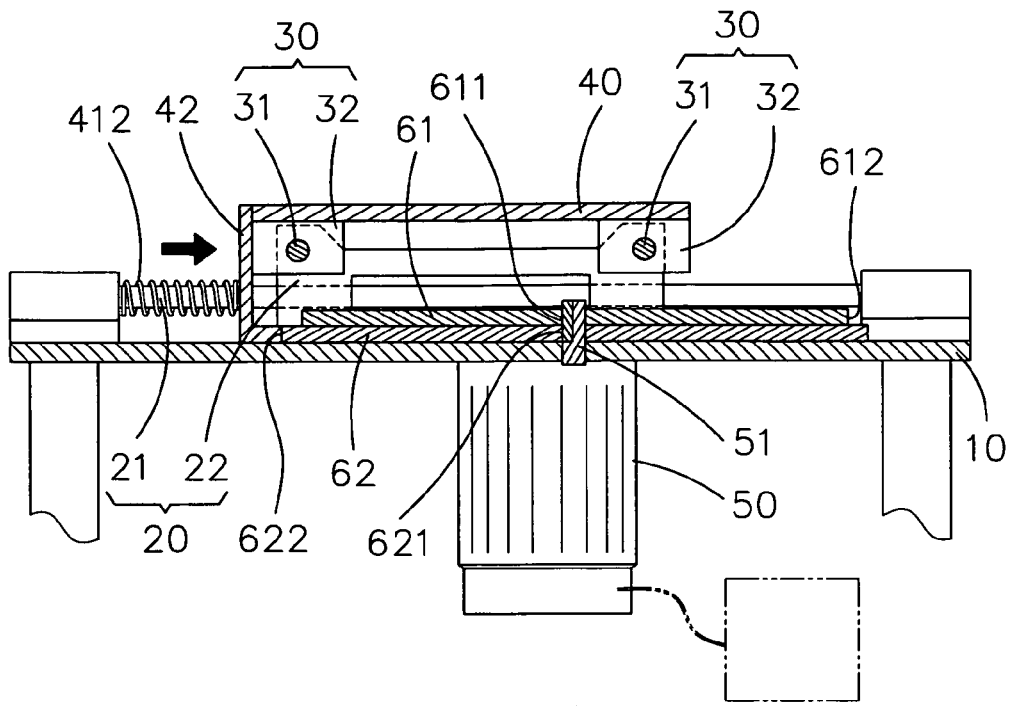
FIG. 5 is a cross-sectional view of a selected portion of the present invention.
Figure 6:
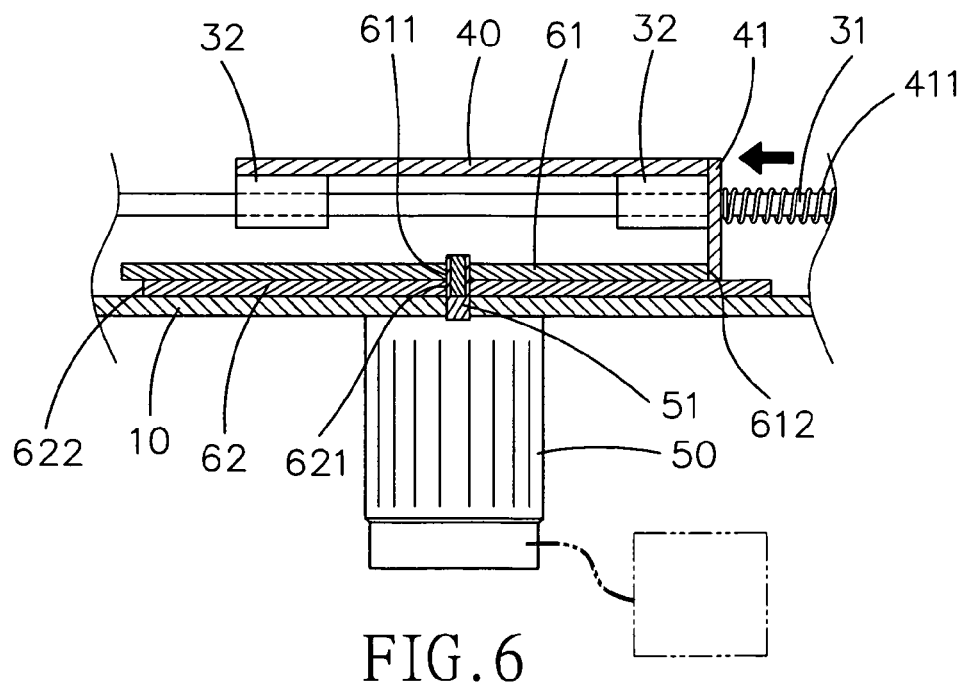
FIG. 6 is a cross-sectional view of another selected portion of the present invention.
Figure 7:
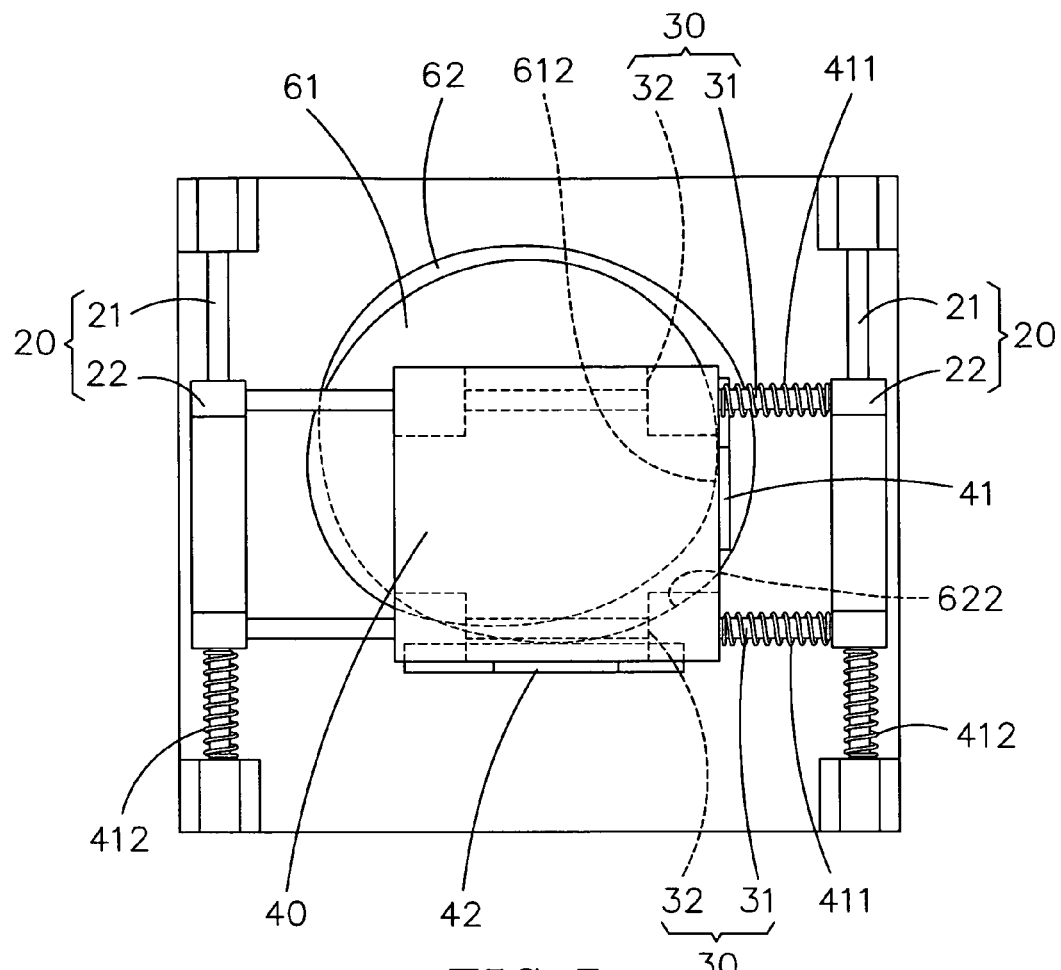
FIG. 7 is a top view of the present invention.

FIGS. 4, 5, 6, and 7 show the first preferred embodiment of the present invention. This invention is a special path generating device. It comprises a base 10, a first axis assembly 20, a second axis assembly 30, a working portion 40, a driving portion 50, a first cam 61, and a second cam 62.

About this first axis slide assembly 20, it includes a first bar 21 and a first slide 22. The first bar 21 is disposed on the base 10. The first slide 22 is movable on the first bar 21.

Concerning this second axis slide assembly 30, it includes a second bar 31 and a second slide 32. The second bar 31 is disposed on the first slide 22. The second slide 32 is movable on the second bar 31.

With regard to this working portion 40, it is mounted on the second slide 32. The working portion 40 has a first contacting portion 41 and a second contacting portion 42. The first contacting portion 41 and the second contacting portion 42 are fixed on the predetermined positions of the working portion 40.

This driving portion 50 is mounted on the base 10. The driving portion 50 has a driving shaft 51.

About this first cam 61, it has a first center 611 and a first cam edge 612. The first center 611 is secured on the driving shaft 51. The first cam edge 612 contacts with the first contacting portion 41.

The second cam 62 has a second center 621 and a second cam edge 622. The second center 621 is secured on the driving shaft 51. The second cam edge 622 contacts with the second contacting portion 42.

Figure 8:
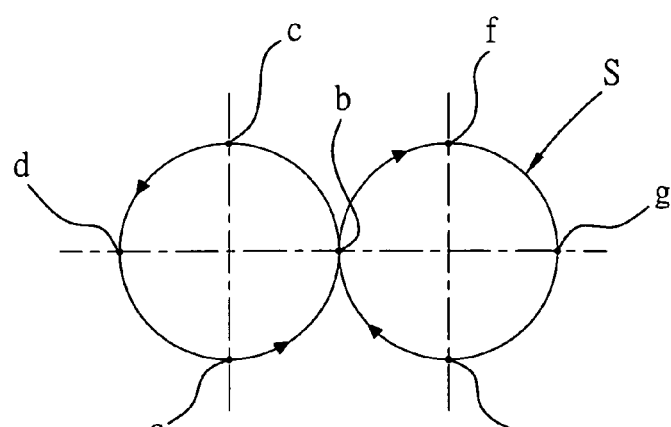
FIG. 8 is a view showing the double circular path generated by the present invention.

Hence, when this driving portion 50 drives the driving shaft 51 rotating, both the first cam 61 and the second cam 62 rotate accordingly so as to make the working portion 40 generating a special path S (as illustrated in FIG. 8).

In this embodiment, it further comprises:

[a] at least one first pushing force generator 411 (such as a spring or the like) to create a pushing force so that the first cam edge 612 contacts with the first contacting portion 411 all the time; and

[b] at least one second pushing force generator 412 (such as a spring or the like) to create another pushing force so that the second cam edge 622 contacts with the first contacting portion 412 all the time.

Furthermore, the special path S could be a double circular path (as shown in FIG. 8).

Relating to the operational principle of this invention, please see FIG. 8. It shows the exact double circular path generated by this invention. This path is started from point a, to point b, to point c, to point d, to point e, to point f, to point g, and finally back to point a. Such moving path is repeated again and again. It forms an exact double circular path S in FIG. 8.

Figure 9:
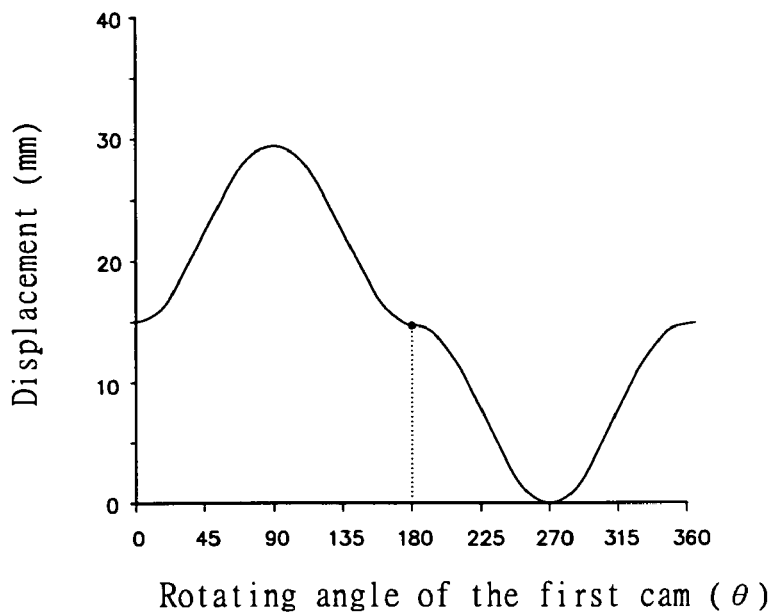
FIG. 9 illustrates the phase-displacement relationship of the first cam of the present invention.
Figure 10:
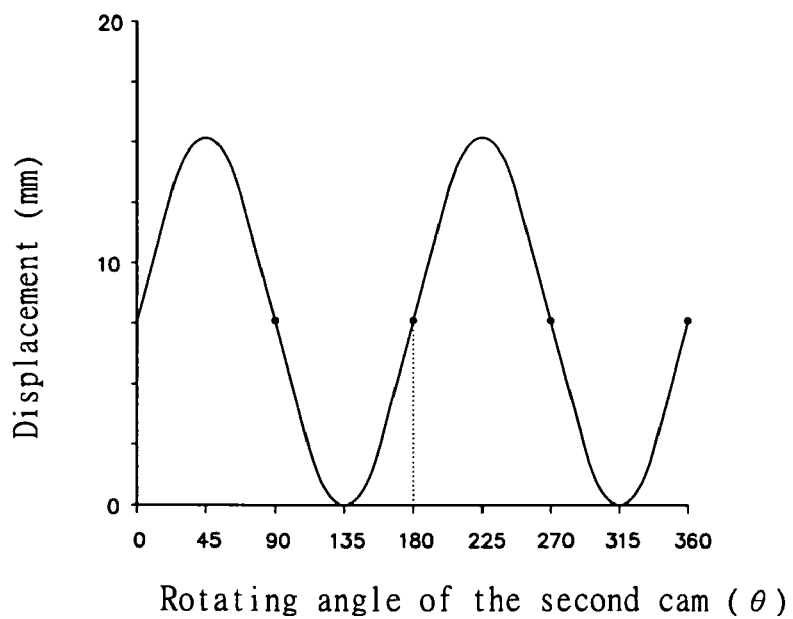
FIG. 10 illustrates the phase-displacement relationship of the first cam of the present invention.

As shown in FIGS. 9 and 10, these diagrams illustrate the phase-displacement relationships (or variations) corresponding to the first cam 61 and the second cam 62 respectively. Based on these specific phase-displacement relationships, an exact double circular path can be obtained. More importantly, it is also a constant-speed exact double circular path.

Hence, the industrial applications of this invention includes:

[a] wafer surface polishing; and

[b] polishing for the edge of an optical fiber and its connector.

This invention can be applied on any kind of polishing or grinding work. The polishing or grinding result is excellent (almost without any polishing crack lines).

Moreover, referring to FIG. 9, the function of the first cam edge 612 of the first cam 61 is to produce the first directional displacement. It includes a positive half wave segment (such as a positive half sine wave or the like) from 0 to 180 degrees and a negative half wave segment (such as a negative half sine wave or the like) from 180 to 360 degrees.

As shown in FIG. 10, the function of the second cam edge 622 of the second cam 62 is to produce the second directional displacement. It includes a ¼ positive segment from 0 to 90 degrees, ¼ negative segment from 90 to 180 degrees, another ¼ positive segment from 180 to 270 degrees, and another ¼ negative segment from 270 to 360 degrees.

Of course, if needed, the phase-displacement relationship for the first cam 61 and the second cam 62 can be modified. That is, it is possible to produce other special path. For example, the second cam edge 622 can be modified into three sets of ⅙ positive segment and ⅙ negative segment (such as ⅙+, ⅙−, ⅙+, ⅙−, ⅙+, and ⅙−) between 0 to 360 degrees. Therefore, this invention can generate three exact circular paths precisely (it could be applied in some special industrial fields). This kind of modification is still in the scope of this invention.

Figure 11:
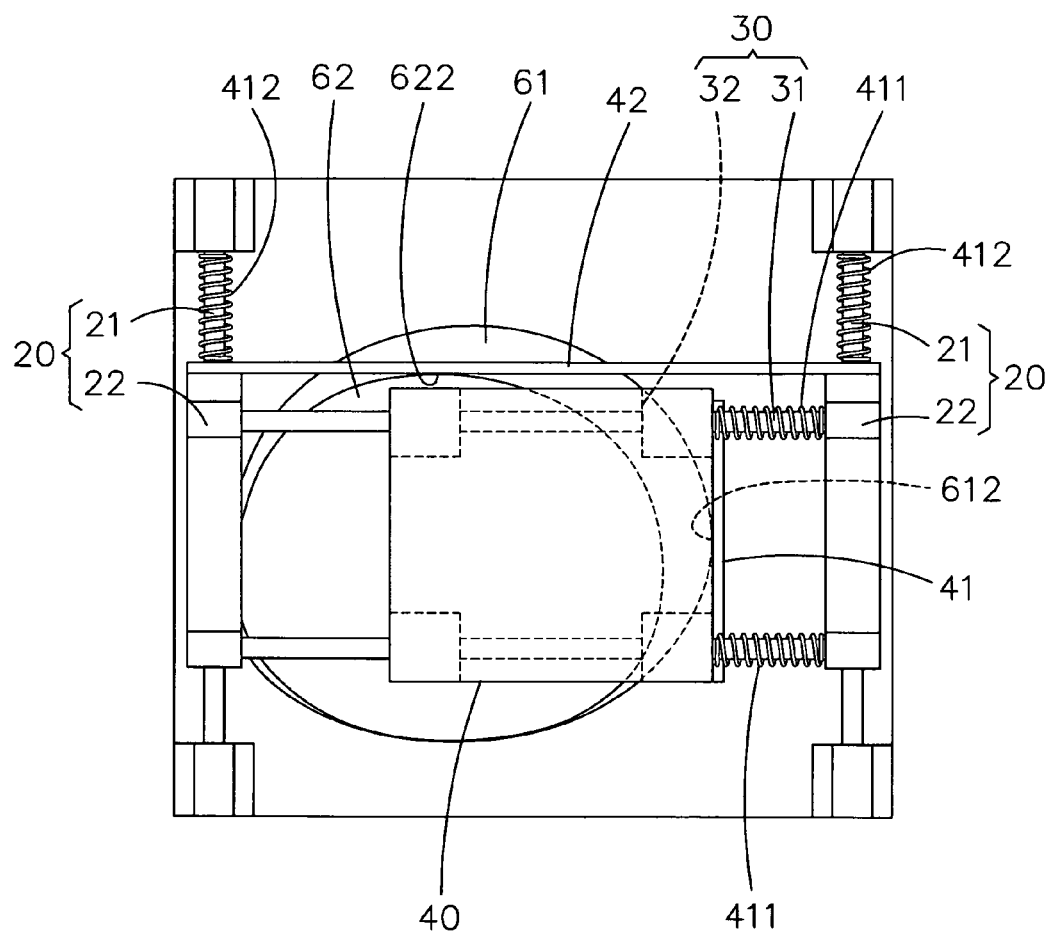
FIG. 11 is a top view of the second preferred embodiment of the present invention.

As illustrated in FIG. 11, it shows the second preferred embodiment of the present invention. The difference between the first preferred embodiment and the second preferred embodiment is only the second contacting portion 42. In FIG. 11, the second contacting portion 42 is mounted on two first slides 22.

The improvements of the present invention can be summarized as follows:

[1] It can produce exact double circular path. This invention contains the unique design for the first cam and second cam. They are driven by one driving source only. In addition, the produced double circular path is an "exact" double circular path, not a "proximal" double circular path. In this invention, its structure is not complicated, but it can achieve to generating the exact double circular path. Of course, once the first cam edge and the second cam edge are modified, different special path can be obtained.

[2] It can generate a constant-speed circular movement. This invention not only can generate the double circular path, but also its movement is a constant-speed circular movement. The moving speed at any point on its path remains the same (no acceleration).

[3] It is easy to control. This invention only needs one driving source and the input is constant speed rotation. There is no need to utilize a computer or a programmable apparatus and its related equipments (including the control lines). It is not required to convert any X-Y coordinate information into the complicated moving path commands. Thus, it is easy to control.

[4] The volume is small. The volume of this invention is smaller than the one of the traditional equipment. So, it is suitable to install in a small factory.

The above embodiments are only used to illustrate the present invention, not intended to limit the scope thereof. Many modifications of the above embodiments can be made without departing from the spirit of the present invention.

What is claimed is:

1. A special path generating device comprising:

a base;

a first axis slide assembly including a first bar and a first slide, said first bar being disposed on said base, said first slide being movable on said first bar;

a second axis slide assembly including a second bar and a second slide, said second bar being disposed on said first slide, said second slide being movable on said second bar;

a working portion mounted on said second slide, said working portion having a first contacting portion and a second contacting portion;

a driving portion mounted on said base, said driving portion having a driving shaft;

a first cam having a first center and a first cam edge, said first center being secured on said driving shaft, said first cam edge contacting with said first contacting portion; and a second cam having a second center and a second cam edge, said second center being secured on said driving shaft, said second cam edge contacting with said second contacting portion;

so that when said driving portion drives said driving shaft rotating, said first cam and said second cam rotate accordingly so as to make said working portion generating a special path.

2. The special path generating device as claimed in claim 1, wherein said first contacting portion and said second contacting portion are fixed on predetermined positions of said working portion.

3. The special path generating device as claimed in claim 1, wherein said working portion further comprising:

at least one first pushing force generator to create a pushing force so that the first cam edge contacts with the first contacting portion all the time; and at least one second pushing force generator to create another pushing force so that the second cam edge contacts with the first contacting portion all the time;

so that the special path is an exact double circular path.

4. The special path generating device as claimed in claim 3, wherein said first pushing force generator is a spring; and said second pushing force generator is another spring.

* * * * *